Oct. 28, 1958

H. E. HOLLMANN 2,858,373

HIGHLY SENSITIVE TRANSDUCERS WITH ELECTROMECHANICAL FEEDBACK

Filed July 18, 1952

INVENTOR
HANS E. HOLLMANN

BY

ATTORNEY

United States Patent Office 2,858,373
Patented Oct. 28, 1958

2,858,373

HIGHLY SENSITIVE TRANSDUCERS WITH ELECTROMECHANICAL FEEDBACK

Hans E. Hollmann, Oxnard, Calif.

Application July 18, 1952, Serial No. 299,779

7 Claims. (Cl. 179—100.4)

(Granted under Title 35, U. S. Code (1952), sec. 266)

The invention described herein may be manufactured and used by or for the Government of the United States of America for governmental purposes without the payment of any royalties thereon or therefor.

The present invention relates to highly sensitive transducers with combined electrical and mechanical feedback and more particularly to transducers in which an electromechanical feedback is accomplished by means of an amplifier and an external feedback loop including a translating member adapted to convert electrical energy into vibrational or mechanical energy.

The present invention is particularly adapted for use in sound reproduction systems. As is well known, conventional phonograph pickups used in sound reproduction systems cause excessive wear both of the stylus and the records employed in such systems. This excessive wear has proved to be an expensive and undesirable feature of phonograph pickups presently used. Attempts have been made to reduce this wear by reducing the weight of the pickup. There exists, however, a lower limit to the weight of the pickup below which the vibrating stylus will not remain in contact with the grooves of the record, and, as a result, the wear cannot be reduced to the desired extent.

An object of the present invention is to provide a transducer which is very sensitive and responds to minute forces acting upon it.

Another object is to provide a highly sensitive transducer which is particularly adapted for use in sound reproduction systems.

A further object is to reduce the force required to actuate a phonograph pickup by means of electromechanical feedback.

Still another object is to provide electromechanical feedback to a phonograph pickup in such a manner that the pickup is simple and inexpensive in construction.

A particular object of the present invention is to reduce the wear of the stylus and records employed in a sound reproduction system.

Figure 1:
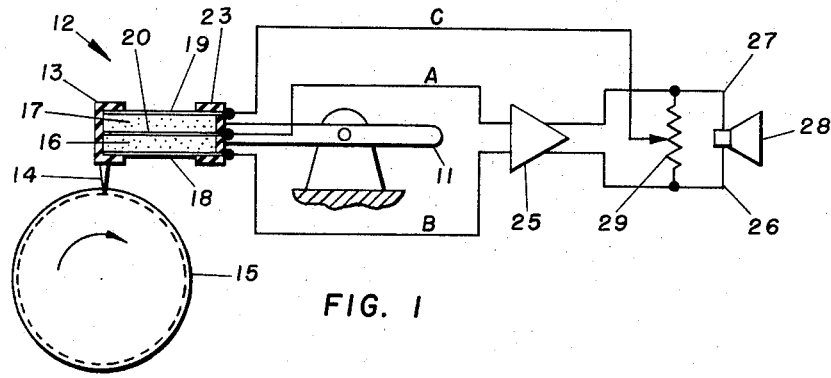
Figure 2:
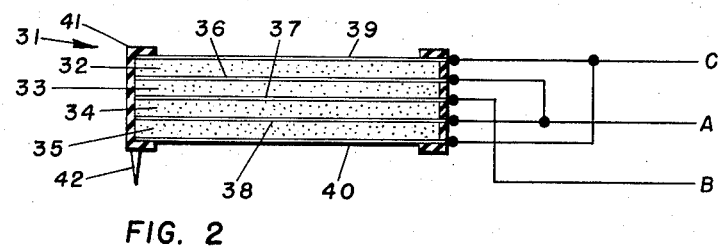
Figure 3:
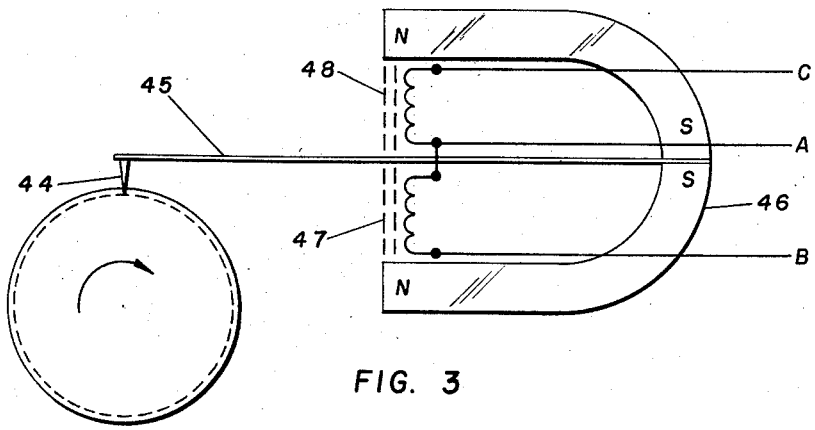
Figure 4:
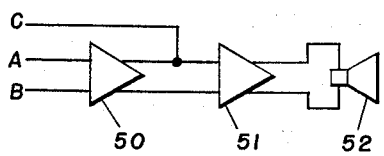

Other objects and many of the attendant advantages of this invention will be readily appreciated as the same becomes better understood by reference to the following detailed description when considered in connection with the accompanying drawings wherein:

Fig. 1 is a schematic view of a sound reproduction system according to the invention, Fig. 2 illustrates a modification of the pickup shown in Fig. 1, Fig. 3 portrays another pickup according to the invention, and Fig. 4 is a schematic view of a further modification of the invention.

The present invention is shown incorporated in a sound reproduction system utilizing an electromechanical feedback to the member driven by the record. This feedback is accomplished in such a manner as to assist the vibrations of the driven member. The force required to actuate the driven member is therefore reduced. Inasmuch as the force required to actuate the driven member is produced by the motor of a record player and is transferred to the pickup by means of the grooves of the record pushing against the stylus, it is evident that since the grooves will not have to exert as much force against the stylus in the present invention as in the case where a feedback is not employed, the wear on the grooves and the stylus will be reduced.

Referring now to the drawing, wherein like reference characters designate like or corresponding parts throughout the several views, there is shown in Fig. 1 a tone arm 11 which by means of a clamping member 23 supports the phonograph pickup indicated generally by numeral 12. A clamping member 13 secures the stylus 14 to the pickup 12 and the stylus 14 is shown in engagement with a record 15. The pickup 12 consists of two piezo-electric crystals 16 and 17 composed of Rochelle salt or like material such as the alkaline earth titanates, e. g. barium titanate or mixtures of barium and strontium titanate. The individual crystals 16 and 17 are cemented together with an intervening electrode 20 of metal foil therebetween, and similar electrodes 18 and 19 are cemented to the outer surfaces of the crystals.

As is well known, the crystals 16 and 17 will develop a voltage differential between their opposite faces when submitted to a bending stress. The record 15 transmits a force to the stylus 14 which causes the stylus 14 to vibrate and these vibrations will accordingly be transmitted to the crystals 16 and 17 by means of the clamping member 13. A bending stress will thus be produced in the crystals, which, as pointed out above, will cause a voltage to be developed across the opposite faces of the crystals and accordingly across the electrodes secured thereto. Although crystals 16 and 17 both develop a voltage across the electrodes secured thereto, only the voltage developed across the crystal 16 is utilized to drive the hereinafter mentioned amplifier of the system.

The crystal 16 will hereinafter be referred to as the driven member of the pickup since it is driven or actuated by the record 15. The member 17 is utilized to assist the vibrations of the driven member 16 due to a feedback of electrical energy to the member 17. The electrical energy fed back to member 17 is translated into vibrational energy by this member and it therefore will henceforth be referred to as the translating member of the pickup. The elements 13, 14 and 16 together constitute a sensing means, since these elements are actuated in accordance with the configuration of the grooves of a record.

Two leads B and C are electrically connected to the electrodes 18 and 19 respectively, while the lead A is electrically connected to the electrode 20. Throughout the specification and drawing, the letters B and C are intended to denote the leads connected only to the driven member and the translating member respectively, via individual electrodes, while the letter A refers to the lead which is connected to both the driven member and the translating member, via a common electrode.

The leads A and B attached respectively to the electrodes 20 and 18 are connected to the input of an amplifier 25, therefore enabling the voltage produced by the crystal 16 to drive the amplifier. The output of the amplifier 25 is connected to a load by means of leads 26 and 27, the load being shown as a loud speaker 28 in Fig. 1. It is to be understood that the load may be an oscilloscope, a pen recorder, or any other device adapted to produce an audible or visible signal.

A potentiometer 29 bridges the leads 26 and 27 and is adapted to adjust the voltage impressed upon lead C. The lead C provides a feedback path for a portion of the output of the amplifier to the translating member 17. The voltage feedback to translating member 17 from the amplifier is so much greater than any voltage produced by the member 17 due to its vibrations as induced by the record, that the voltage so induced is of negligible effect. The voltage impressed upon member 17 by way of the feedback path C will produce a bending of the member 17 due to the inverse piezo-electric effect in a well known manner.

It should be noted that the feedback must produce a bending of the crystal 17 in the same direction as the crystal 16, or in other words, the vibrations of the two members 16 and 17 must be in phase. This may be accomplished in a number of ways, such as by adjusting the phase of the output voltage of the amplifier so that it is in phase with the voltage produced by driven member 16, or by varying the crystallographic cut of member 17 in such a way as to cause it to bend in the desired direction. It is evident that any vibrations of the member 17 produced by the voltage which is fed back from the output of the amplifier will be transferred to the driven member 16 since the members 16 and 17 are cemented together. In this manner vibrations of the member 17 which are in phase with the vibrations of the member 16 will assist the member 16 in its movement and therefore less force is required to be applied to the stylus 14 to cause a given vibration of the driven member 16.

The electromechanical feedback loop is closed from the output of the amplifier back to the driven member 16 through the intermediary of the feedback path C and the positioning of the member 17 with respect to member 16 such that they are mechanically coupled and the former member transfers its vibrational energy to the latter member. The potentiometer 29 may be utilized to vary the voltage impressed upon the translating member 17 and therefore adjust the feedback of the device.

Fig. 2 shows a modified pickup 31 which may be substituted for the pickup 12 of Fig. 1. The pickup 31 consists of four piezoelectric crystals 32, 33, 34 and 35 which are cemented together with electrodes 36, 37 and 38 of metal foil interposed therebetween, and similar electrodes 39 and 40 are cemented to the outer faces of the crystals 32 and 35 respectively. The electrodes 36 and 38 are connected to the lead A which corresponds to lead A of Fig. 1. Electrode 37 is connected to lead B which corresponds to lead B of Fig. 1 and electrodes 39 and 40 are connected to lead C which corresponds to lead C of Fig. 1. A clamping member 41 secures the stylus 42 to the pickup 31. In this modification, crystals 33 and 34 together compose the driven member and crystals 32 and 35 compose the translating member. The driven member and the associated stylus and clamping member form a sensing means in this modification.

Fig. 3 illustrates still another modification of the pickup. In this modification, the stylus 44 is mounted on a flexible armature 45 which is secured at one end in a supporting member 46 shown as a horse-shoe magnet with north poles at its open ends and a south pole adjacent the armature as indicated. Two coils 47 and 48 are secured within the north poles of the magnet and are positioned closely adjacent the armature 45. It is evident that any vibratory movements of the armature 45 will induce a voltage in the coils 47 and 48, and the coils 47 and 48 correspond to the crystals 16 and 17 respectively of Fig. 1. In this modification, therefore, the coil 47 may be referred to as the driven member and the coil 48 may be referred to as the translating member. The members 44, 45 and 47 constitute a sensing means in this modification.

The lead A which is attached at one end to adjacent ends of both coils 47 and 48, and the lead B which is attached at one end to the coil 47, are both connected at their other ends to the input of an amplifier (not shown) as in Fig. 1, and the lead C which is connected at one end to coil 48 is connected at its other end to the output of such amplifier similarly to Fig. 1. It is evident that any vibrations of the armature 45 produced by a record acting on the stylus 44 induces a voltage in the coil 47 which, through the intermediary of the leads A and B, drives the amplifier.

The voltage which is fed back through the feedback path C to the coil 48 causes the magnetic field surrounding the armature 45 to vary in such a manner as to tend to induce the armature 45 to vibrate. It is also evident that the phase of the voltage applied to the coil 48 must be adjusted in such a manner that the coil 48 tends to cause the armature 45 to vibrate in the same direction as vibrations induced by a record acting on the stylus 44, or in other words, the voltage impressed upon coil 48 must be in phase with the voltage induced in coil 47. It may be seen that the electromechanical feedback loop is closed in this device by the feedback path C and the relative position of the coil 48 and the armature 45 enabling the coil 48 to transfer vibrational energy to the armature 45.

Fig. 4 shows a modification of the invention which may be utilized to overcome certain difficulties encountered with the device shown in Fig. 1. In the basic circuitry shown in Fig. 1, it is not possible to manipulate the volume control of the amplifier without affecting the degree of feedback at the same time. The best value of the feedback voltage to member 17 may be determined and this value of the feedback voltage should be maintained constant during operation of the device to give the best results. The amplifier shown in Fig. 4 is divided into two parts, a preamplifier 50 and a power amplifier 51. The output leads of the power amplifier are connected to a load shown as a loud speaker 52. The feedback lead C is connected to the output of the preamplifier whereby the value of the feedback voltage may be preset by adjusting the value of the gain of the preamplifier and subsequently these values are not altered during operation of the system. The power amplifier may incorporate a volume control for the loud speaker and since the feedback voltage is independent of the power amplifier the volume control will not affect the feedback voltage.

It is desirable to adjust the feedback voltage to as large a value as is practicable so that a greater mechanical force is produced by the translating member which will in turn assist the driven member in its vibrations. However, care must be taken that the value of the feedback voltage is slightly less than the critical value which causes self-excitation of the pickup.

In each of the pickups shown in Figs. 1, 2 and 3, the driven member may become the translating member and the translating member may become the driven member merely by reversing the connections of the leads B and C to the amplifier. For example, if in Fig. 1, lead B were connected to the output of the amplifier and lead C were connected to the input of the amplifier, member 16 would then become the translating member and member 17 would become the driven member. An electromechanical feedback would be accomplished just as before. The pickups shown in Figs. 2 and 3 may be similarly altered.

It may be noted that in each of the modifications of the invention, there is provided a sensing means which is actuated in accordance with the configuration of the grooves of a record. A stylus or vibrational pickup means is adapted to cause a driven member to vibrate when the vibrational pickup means is acted upon by an external force. Vibrations of the driven member produce electrical energy which is transmitted by means of an electrical circuit to the input of an amplifier. The output of the amplifier is connected in each case to an electrical circuit which is adapted to feed back a portion of the amplified energy produced by the amplifier to a translating member. The translating member is adapted to convert the electrical energy which is fed back from the amplifier into vibrational energy, and the position of the translating member relative to the driven member enables the translating member in each case to transfer the vibrational energy produced thereby to the driven member. In this manner an electromechanical feedback is provided from the output of the amplifier to the driven member so as to produce a force which assists in actuating the driven member.

It should be noted that the pickups as shown are adapted for use with records produced by means of vertical cutting such as those utilized with Dictaphone machines. However, the invention may as readily be utilized with horizontally-cut records by merely mounting the stylus on the pickup or armature at right angles to the position shown in the drawings.

When pickups utilizing piezo-electric crystals are desired to be used with horizontally cut records, the stylus may also be mounted as shown in Figs. 1 and 2. However, under these circumstances the crystals must be cut so that they will exhibit piezo-electric characteristics when subjected to a twisting or torsional stress rather than a bending stress.

It is apparent from the foregoing that the invention provides an electromechanical feedback in a highly sensitive transducer by use of only a few inexpensive components, and is simple in construction yet sturdy and positive in its operation.

Obviously many modifications and variations of the present invention are possible in the light of the above teachings. It is therefore to be understood that within the scope of the appended claims the invention may be practiced otherwise than as specifically described.

I claim:

1. An electromechanical transducer which comprises a stylus mounted at one end of a tone arm and adapted to make contact with the grooves of a record, two piezoelectric crystals connected to each other by means of a first common electrode positioned therebetween, a second electrode connected to the outer surface of one of said crystals, a third electrode connected to the outer surface of said other crystals, said stylus being attached to said crystals, amplifier means, electrical leads connecting said first and second electrodes respectively to the input of said amplifier means, a load electrically connected to the output of said amplifier means and an electrical lead connecting the output of said amplifier means to said third electrode, said last mentioned lead providing a positive feedback path for a portion of the amplified electrical energy to said other crystal, and means structurally connecting said two crystals in fixed relative relationship.

2. An electromechanical transducer which comprises a plurality of piezoelectric crystals structurally connected in fixed relative relationship, amplifying means connected to one of said crystals for amplifying the voltages produced thereby in response to vibrational forces externally applied thereto, and means connecting said amplifying means to another of said crystals thereby providing a positive feedback path.

3. An electromechanical transducer which comprises a first plurality of spaced piezoelectric crystals, a second plurality of piezoelectric crystals positioned in the space between said first crystals, a first electrode common to said second crystals, a plurality of second electrodes each of which is connected to one of said first and one of said second crystals, a plurality of third electrodes each of which is connected to one of said first crystals, means for subjecting all of said crystals as a unit to vibrational forces to develop a voltage across said first and second electrodes, means for impressing the voltages developed across said first and second electrodes on the input of an amplifier, means for impressing a portion of the output energy of said amplifier on said third electrodes, and means structurally connecting each of said crystals in fixed relative relationship to one another.

4. An electromechanical transducer comprising a plurality of piezoelectric crystals assembled in unitary fashion so as to preclude relative movement therebetween, means for subjecting said crystals as a unit to vibrational forces to thereby develop a voltage differential across each crystal, an amplifier, circuit means for applying the voltage developed across one crystal of said plurality to said amplifier, and further circuit means for feeding back at least a portion of the voltage output of said amplifier to another crystal of said plurality to induce vibrational energy therein of such phase as to reduce the magnitude of the vibrational forces to which the crystal assembly must be subjected in order that the voltage output therefrom as applied to said amplifier be maintained above a predetermined level.

5. An electromechanical transducer which comprises a first plurality of piezoelectric crystals, a second plurality of piezoelectric crystals equal in number to said first plurality and with the crystals of said second plurality interleaved with the crystals of said first plurality, all of said crystals being assembled as a unit in such fashion that no relative movement can occur therebetween, means for subjecting said crystals as a unit to vibrational forces to thereby develop a voltage differential across each crystal of said assembly, an amplifier, circuit means for applying the voltage developed across each crystal of one of said pluralities to said amplifier, and further circuit means for feeding back at least a portion of the voltage output of said amplifier to each crystal of the other of said pluralities to induce vibrational energy therein of such phase as to reduce the magnitude of the vibrational forces to which the crystal assembly must be subjected in order that the voltage output therefrom as applied to said amplifier be maintained above a predetermined level.

6. A device as defined in claim 4, in which said amplifier comprises a pre-amplifier and a power amplifier electrically connected to the output of said pre-amplifier.

7. A device as defined in claim 4, in which said circuit means for feeding back at least a portion of the voltage output of said amplifier to another crystal of said plurality includes a potentiometer connected across the output of said amplifier.

References Cited in the file of this patent

UNITED STATES PATENTS

| 1,535,527 | Harrison | Apr. 28, 1925 |
| 2,351,079 | Strobel | June 13, 1944 |
| 2,386,657 | Carstarphen | Oct. 9, 1945 |
| 2,475,200 | Roys | July 5, 1949 |
| 2,495,809 | Graham | Jan. 31, 1950 |
| 2,568,797 | Eland | Sept. 25, 1951 |
| 2,769,867 | Crownover et al. | Nov. 6, 1956 |